(12) United States Patent
Kiel et al.

(10) Patent No.: US 8,757,867 B2
(45) Date of Patent: Jun. 24, 2014

(54) MIXING DEVICE FOR FOOD MASSES AND A SAUSAGE FILLING MACHINE

(75) Inventors: Tobias Kiel, Verden (DE); Kersten Nilsson, Verden (DE)

(73) Assignee: Vemag Maschinenbau GmbH, Verden/Aller (DE)

( * ) Notice: Subject to any disclaimer, the term of this patent is extended or adjusted under 35 U.S.C. 154(b) by 1136 days.

(21) Appl. No.: 12/704,922

(22) Filed: Feb. 12, 2010

(65) Prior Publication Data

US 2010/0208547 A1 Aug. 19, 2010

(30) Foreign Application Priority Data

Feb. 13, 2009 (DE) .................. 20 2009 002 115 U

(51) Int. Cl.
*B01F 5/06* (2006.01)

(52) U.S. Cl.
USPC ........................................................ 366/339

(58) Field of Classification Search
USPC ............ 366/336, 338, 339, 80, 174.1, 175.2
See application file for complete search history.

(56) References Cited

U.S. PATENT DOCUMENTS

| 1,698,314 A | 1/1929 | Mapelsden |
| 1,972,151 A | 9/1934 | Link |
| 2,076,465 A | 4/1937 | Kirk |
| 2,111,463 A | 3/1938 | Steensgaard |
| 2,836,199 A | 5/1958 | Wilson |
| 3,223,388 A * | 12/1965 | Knox ........................... 366/339 |
| 3,474,818 A | 10/1969 | Hartman |
| 3,484,078 A | 12/1969 | Haenky |
| 3,787,080 A * | 1/1974 | Daniel ......................... 285/341 |
| 3,794,300 A * | 2/1974 | Harder ......................... 366/339 |
| 3,949,970 A * | 4/1976 | ter Braak ...................... 366/339 |
| 3,953,002 A * | 4/1976 | England et al. .............. 366/322 |
| 4,003,554 A * | 1/1977 | Chauffoureaux .......... 425/174.4 |
| 4,050,676 A * | 9/1977 | Morishima et al. ........... 366/339 |
| 4,053,141 A * | 10/1977 | Gussefeld ..................... 366/339 |
| 4,284,105 A * | 8/1981 | Moked et al. .................. 138/42 |
| 4,372,734 A * | 2/1983 | Dolan et al. ............... 425/131.1 |
| 4,524,081 A * | 6/1985 | Bansal ......................... 426/249 |

(Continued)

FOREIGN PATENT DOCUMENTS

| AT | 292494 T | 4/2005 |
| DE | 294374 C | 4/1915 |

(Continued)

OTHER PUBLICATIONS

German Patent Office, Search Report issued in related application serial No. 20 2009 002 115.7 dated Feb. 13, 2009.

(Continued)

*Primary Examiner* — Tony G Soohoo
(74) *Attorney, Agent, or Firm* — Wood, Herron & Evans LLP

(57) ABSTRACT

The present invention concerns a mixing device for foodstuff materials capable of flow, in particular sausage meat. The device comprises a housing having an inlet for introduction of the material and an outlet for discharge of the material. In order to improve the mixing and flow, in particular of sausage meat, at least two helical mixing elements are arranged statically in mutually juxtaposed relationship within the housing for mixing and/or processing material flowing through the housing. Meat products such as air-bearing sausage meat can be gently and carefully thoroughly mixed. Even delicate inclusions, such as mushrooms, would not be damaged.

12 Claims, 4 Drawing Sheets

(56) References Cited

U.S. PATENT DOCUMENTS

| | | | |
|---|---|---|---|
| 4,989,631 A | 2/1991 | Harbin | |
| 5,004,005 A | 4/1991 | Graves | |
| 5,881,996 A | 3/1999 | Walsh, Jr. et al. | |
| 6,012,492 A | 1/2000 | Kozyuk | |
| 6,016,742 A | 1/2000 | Hauck et al. | |
| 6,102,561 A * | 8/2000 | King | 366/181.5 |
| 6,132,302 A | 10/2000 | Hiller et al. | |
| 8,246,237 B2 * | 8/2012 | Schlummer | 366/91 |
| 2002/0075754 A1 | 6/2002 | Huber et al. | |
| 2004/0099145 A1 | 5/2004 | Evans et al. | |
| 2006/0219147 A1 | 10/2006 | DeRosa | |
| 2010/0208547 A1* | 8/2010 | Kiel et al. | 366/183.1 |
| 2011/0082431 A1 | 4/2011 | Burgess et al. | |

FOREIGN PATENT DOCUMENTS

| | | |
|---|---|---|
| DE | 1900567 A1 | 8/1970 |
| DE | 3539426 A1 | 5/1987 |
| DE | 69801921 T2 | 6/2002 |
| DE | 10111001 A1 | 9/2002 |
| DE | 102005059052 A1 | 6/2007 |
| DE | 202008004552 U1 | 7/2008 |
| EP | 1832176 A1 | 9/2007 |
| RU | 2019967 C1 | 9/1994 |
| WO | 9102183 A1 | 2/1991 |

OTHER PUBLICATIONS

German Patent Office, Search Report issued in related German Patent Application Serial No. 20 2008 016 702.7 dated Feb. 20, 2009.

European Patent Office, Extended Search Report issued in related European application No. 10153426.1 dated Feb. 14, 2012.

USPTO, final Office Action issued in related U.S. Appl. No. 12/641,365 dated Jan. 4, 2013.

USPTO, Office Action issued in related U.S. Appl. No. 12/641,365 dated Jun. 26, 2012.

* cited by examiner

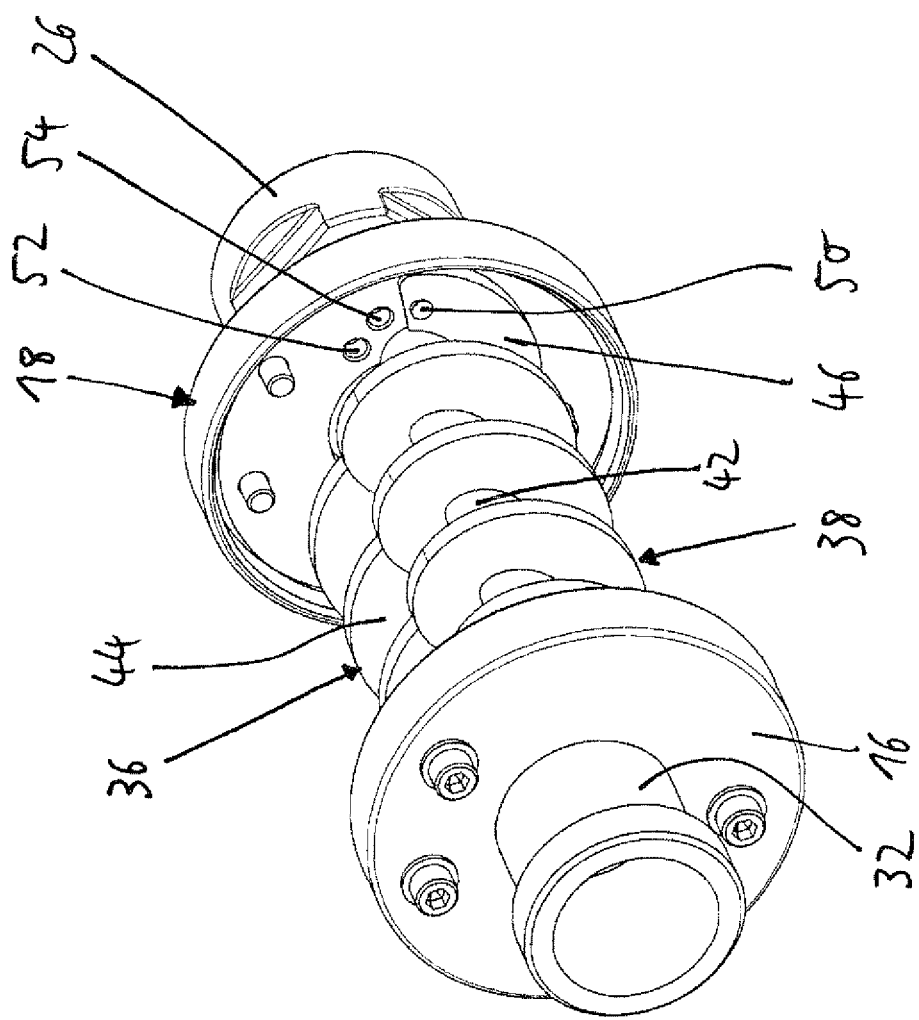

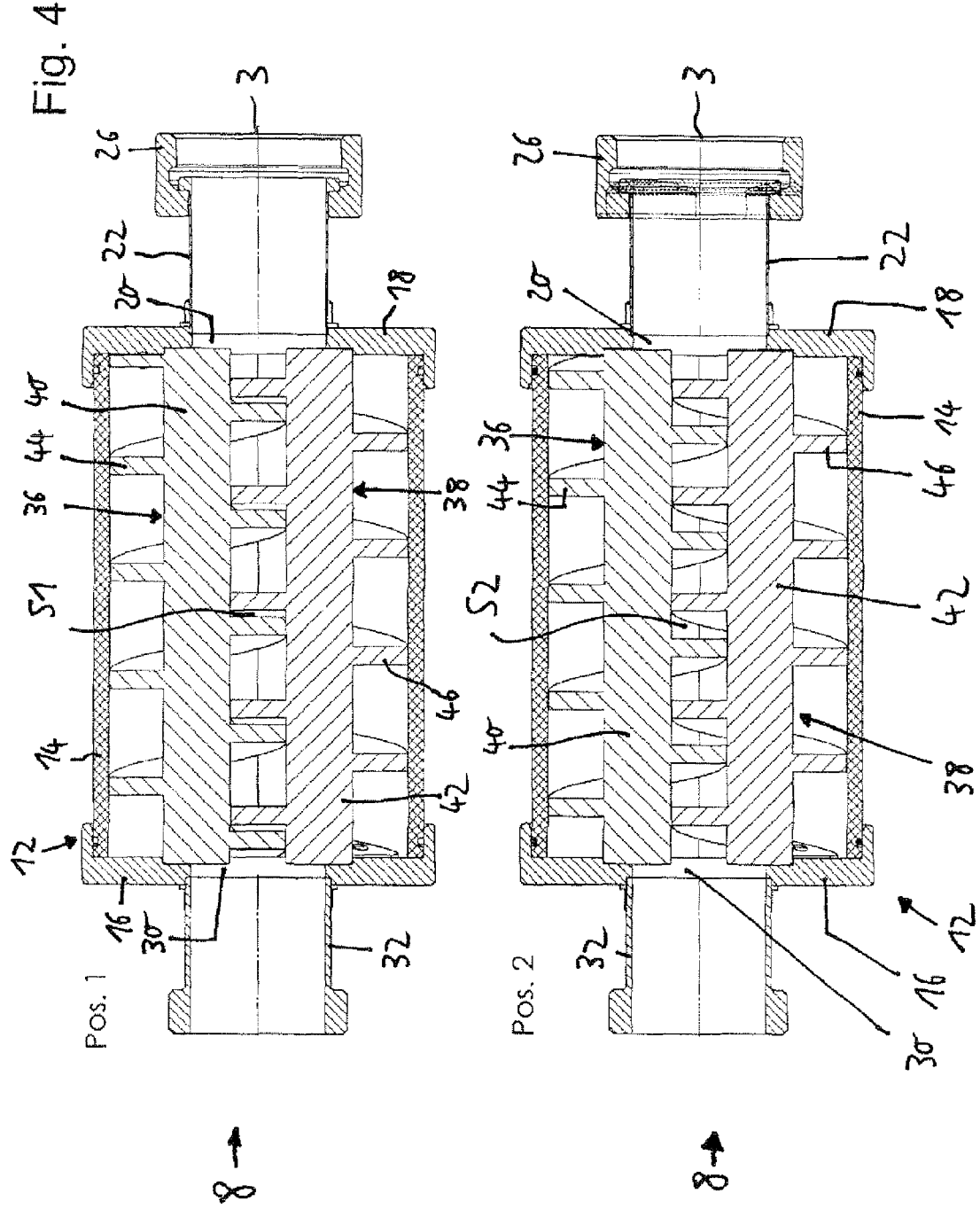

MIXING DEVICE FOR FOOD MASSES AND A SAUSAGE FILLING MACHINE

BACKGROUND

The present invention concerns a mixing device and a filling machine.

Filling machines of the kind set forth in the opening part of this specification serve for filling pasty foodstuff masses or materials in packagings. Thus such filling machines can be used for filling meat products such as sausage meat which is to be heated in water, ground meat, small sausages or the like into cases of natural or synthetic casing skin. A filling machine has a filling hopper for receiving the material, a conveyor pump and a filling tube for delivery of the material. It is possible to connect downstream of the filling machine for example clippers for clamping off ends of a sausage portion, filling flow dividers for dividing up the flow of material into a plurality of individual flow portions or other so-called accessory devices which can be coupled to a filling machine. A filling machine can also be coupled to a downstream-connected mixing device of the kind set forth in the opening part of this specification.

Mixing devices are used for example when filling sausage meat materials to be heated in water. When filling such sausage meat materials, that can involve agglomeration of air present in the material, that is to say the formation of relatively large air bubbles within the material, which are unwanted and are not accepted by customers. Air contained in the material is finely distributed by means of a mixing device connected downstream of the filling machine. Different kinds of mixing devices are used in the state of the art.

Thus nozzles arranged within a tubular housing and having a reduction in cross-section are used. When the sausage meat material containing the air flows through the nozzle, large air bubbles are reduced in size for example by virtue of turbulence. Depending on the respective kind of product, a special nozzle diameter is used. Installation and conversion and the complication and expenditure linked thereto are considered to be a disadvantage. In addition inclusions contained in the foodstuff material, for example pieces of mushroom in sausage meat, can be damaged or destroyed by virtue of the reduction in cross-section.

In addition, labyrinth nozzles disposed within the housing of the mixing device are used, such nozzles having a plurality of labyrinth-like deflection elements which provide for multiple deflection of the material and thereby provide for an air distribution effect. This can also involve damage to inclusions, for example mushrooms. In addition longer fibers present in the material such as tendons and sinews or the like can remain caught up at the deflection elements, for example the edges thereof, and can accumulate there, which can result in blockage of the labyrinth nozzles.

In addition, static mixers with separating elements, which are similar to the labyrinth nozzles are known, which also provide for deflection of the flow of the material, but they also suffer from the disadvantage that inclusions such as mushrooms are damaged at the separating surfaces or edges of the separating elements or elongate tendons or sinews or fibers remain caught up at the edges and cause blockages.

BRIEF SUMMARY

An object of the invention is to provide a mixing device for foodstuff materials which are capable of flow, in particular sausage meat, sausage meat which is to be heated in water for cooking, or other meat products, which involve reliable careful and thorough mixing. In particular the invention seeks to provide a mixing device with which air-bearing sausage meat which is to be heated in water can be thoroughly mixed or sausage meat with inclusions can be gently and carefully thoroughly mixed in such a way that even delicate inclusions such as mushrooms are not damaged. A further object of the invention is to provide a filling machine having a mixing device coupled thereto.

The invention attains the object with a mixing device of the kind set forth in the specification, in which there are at least two helical mixing elements arranged in mutually juxtaposed relationship statically within the housing for mixing and/or processing material flowing through the housing.

The invention further attains the object with a filling machine of the kind set forth in the specification, which is coupled to a mixing device according to the invention.

The adjacent helical mixing elements provide that the foodstuff material flowing therethrough is thoroughly mixed in a particularly gentle and careful fashion. For that purpose, the material, in particular a sausage meat which can include inclusions, is conveyed into the housing and then flows through the free flow cross-sections between the adjacently arranged helical mixing elements. The helical mixing elements are basically arranged statically during operation, that is to say basically they do not rotate but are fixed stationarily within the housing. By virtue of the helical shape of the turns of the mixing elements, that arrangement provides for comparatively careful and gentle deflections of the flow of the material and separation effects in respect of the material flow along the helical free flow cross-sections for thorough mixing thereof. Agglomeration phenomena are reduced thereby and gas is distributed more finely. At the same time even delicate inclusions in the material such as mushrooms are not damaged. Accumulations of longer particles such as fibers or tendons or sinews are equally avoided as there are no edges on guide elements.

A particularly effective thorough mixing effect is afforded in accordance with an advantageous embodiment by the helically extending turns of two adjacent mixing elements engaging into each other.

In accordance with a preferred embodiment, it is proposed that the turn of a helical mixing element extends continuously without interruption substantially over the entire axial length of the housing. That ensures that there are no edges at which tendons or sinews or other particles could cling.

It is further proposed that a turn extends in the radial direction substantially as far as the core of an adjacent mixing element and the longitudinal axes of the helical mixing elements are arranged in substantially mutually parallel relationship. That ensures a defined flow which moves in part outwardly to the wall of the housing and then inwardly again in order there to lead to renewed mixing of partial flows.

An alternative embodiment is distinguished in that three or more helical mixing elements are arranged in mutually parallel and adjacent relationship within the housing. That provides in particular that larger amounts can be processed and/or a higher level of mixing is achieved without the structural length of the device being increased.

The mixing flow is further advantageously developed by the turns of the mixing elements being in contact with the housing, with their outer peripheral surface.

In accordance with an alternative embodiment, it is proposed that at least one of the helical mixing elements is arranged within the housing rotatably about a longitudinal axis and in operation can be fixed in a plurality of rotational positions. The spacing of two adjacent turns can be varied and adjusted by rotation of a helical mixing element. That can serve for adaptation to specific product properties. In operation, the mixing element is fixed after being set so that it does not rotate during the flow of material therethrough but is static. Fixing is advantageously effected by the rotatable helical mixing element being fixable by means of a pin which is arranged with one end within a bore in the housing and which with an end can be brought into engagement with a bore in a turn of the helical mixing element.

An alternative embodiment is distinguished in that the housing has a peripheral portion and two oppositely disposed connecting plates which have the inlet and outlet respectively and/or that the housing can be secured to a filling machine by means of a tube connection arranged on a connecting plate and a union nut and/or that the housing can be coupled to an accessory device by means of a tube connection arranged on a connecting plate. That makes it possible to implement simple connecting options.

An alternative embodiment provides that the pitch of a turn is in the region of between 12 and 72 mm and/or the thickness of a turn is in the region of between 4 and 20 mm and/or that each helical mixing element has between about 3 and 10 turns.

The foregoing advantages are equally achieved in a combination of a filling machine and a downstream-connected mixing device co-operating therewith. In that respect reference is made to the foregoing description.

The invention is described in greater detail hereinafter by means of an embodiment by way of example of a filling machine and a mixing device.

BRIEF DESCRIPTION OF THE SEVERAL VIEWS OF THE DRAWINGS

FIG. 3 shows a perspective view of a part of the mixing device according to the invention in FIG. 2, and FIG. 4 shows a sectional view of the mixing device in two positions 1 and 2, with screws set differently relative to each other.

DETAILED DESCRIPTION

Figure 1:
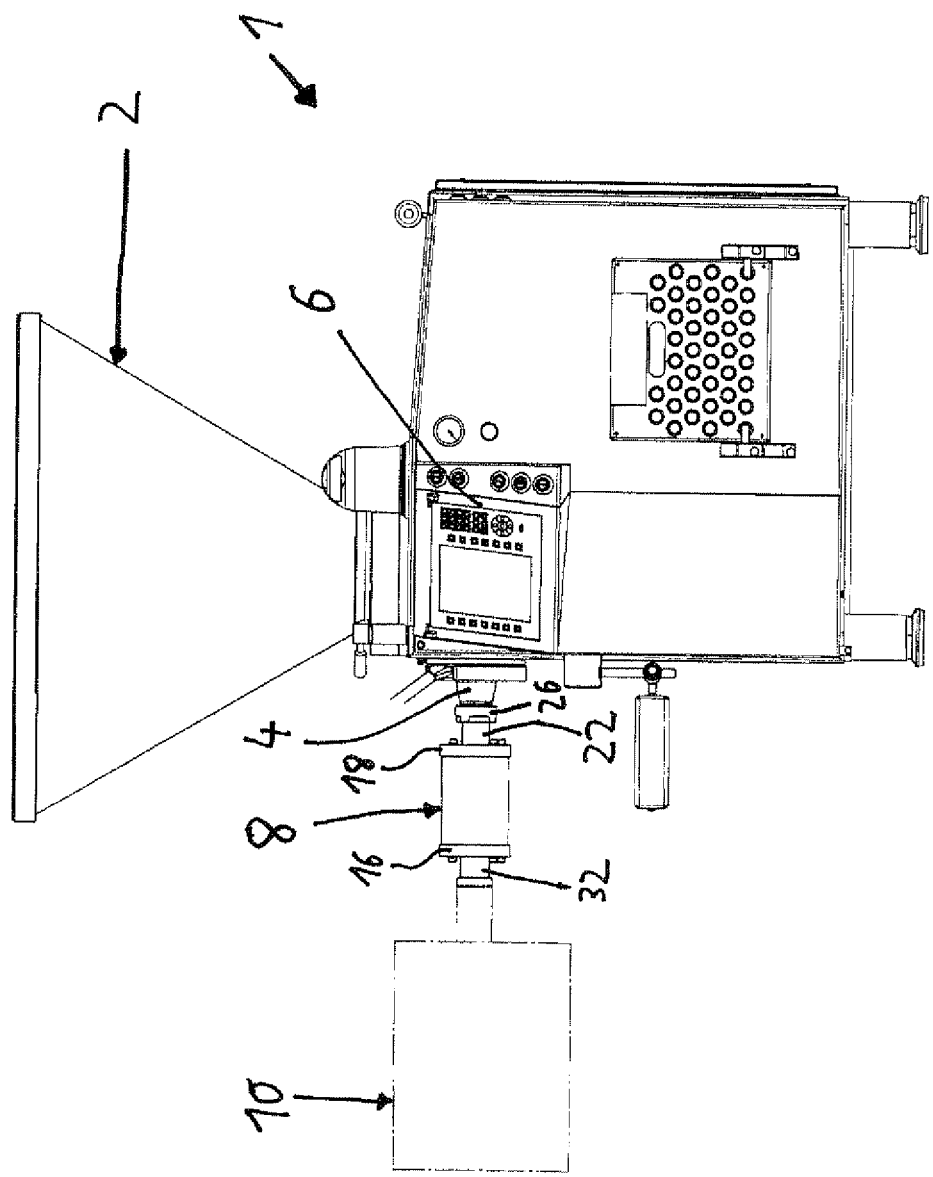
FIG. 1 shows a side view of a filling machine with mixing device connected thereto.

The device shown as a side view in FIG. 1 for conveying or filling materials which are capable of flow, also referred to as a filling machine 1, is in the form of a vacuum filling machine 1 and serves for conveying sausage meat. It has inter alia a hopper-shaped supply container 2 for receiving and storing the meat or other pasty material such as dough. A filling pump (not shown) conveys the material into a filling tube 4 or filling tube holder 4 for discharge of the material from the filling machine. At its free end, the filling tube 4 has a male screwthread. The filling machine 1 can be controlled by means of a control system and operating panel 6.

A mixing device 8 for mixing and/or processing the foodstuff mass or material which is capable of flow in accordance with the invention is coupled to the filling machine 1 in the illustrated embodiment, but it could also be coupled to another pump for conveying a pasty foodstuff material or connected to a conduit through which the pasty material can be conveyed. The mixing device 8, also shown in FIGS. 2, 3 and 4, serves generally for processing material flowing therethrough. Specifically, in the illustrated embodiment, it serves for more finely distributing gas inclusions, in particular air inclusions within the sausage meat, by means of helical mixing elements which are described in greater detail hereinafter.

Connected downstream of the mixing device 8 in the direction of flow of the material is a so-called accessory device 10, which in the illustrated embodiment is a so-called portioning device. It could alternatively also be in the form of a filling flow divider, mincer or so-called clipper for dividing up and closing individual sausage portions or the like.

The mixing device 8 has a housing 12 which in turn has a peripheral portion 14 and two oppositely disposed connecting plates 16, 18 which laterally close the open ends of the peripheral portion 14. The connecting plate 18 has centrally a circular inlet 20 for introduction of material capable of flow into the interior of the housing 12. The inlet 20 communicates with a tube connection 22, which is arranged coaxially with respect to a longitudinal axis 3 of the mixing device 8 and which at its free end has a projecting collar 24. The tube connection 22 can be connected to the filling tube 4 of the filling machine 1 by means of a union nut 26 engaging behind the collar 24 so that material capable of flow, such as sausage meat, can be conveyed out of the filling machine 1 into the interior of the mixing device 8 and through the mixing device 8. The connecting plate 18 engages over the peripheral portion 14 and is additionally sealed off by means of a seal 28. The connecting plates 16, 18 are screwed to the peripheral portion 14 by means of a screw connection.

An outlet 30 for discharge of the material out of the interior of the mixing device 8 is in the form of a circular opening centrally on the connecting plate 16. A tube connection 32 communicates with the outlet 30 and has a collar or male screwthread so that the mixing device 8 can be connected to a further device such as the accessory device 10 by means of a union nut or by means of a screwthread. The connecting plate 16 is also sealed off in relation to the peripheral portion 14 of the housing by means of an O-ring seal 34.

Figure 2:
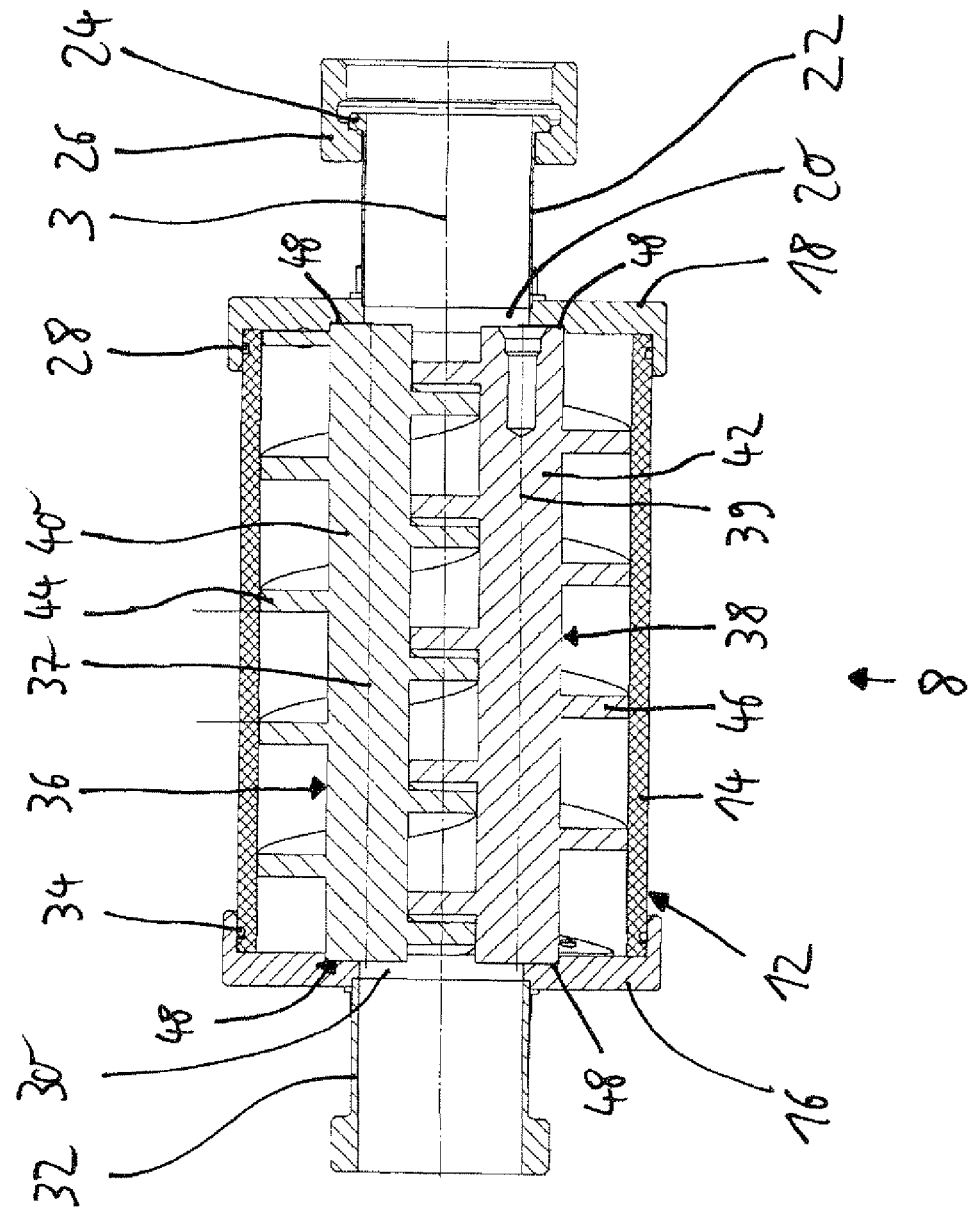
FIG. 2 shows a sectional view of a mixing device according to the invention.

As shown in FIGS. 2 and 3 two helical mixing elements 36, 38 for mixing and/or processing material are arranged in mutually juxtaposed relationship within the housing 12 of the mixing device 8. The longitudinal axes 37, 39 of the mixing elements 36, 38 are arranged parallel to each other and parallel to the longitudinal axis 3. Each mixing element 36, 38 has a substantially cylindrical core 40, 42 and a respective helically extending turn 44, 46 projecting substantially radially from the core 40, 42. In the illustrated embodiment, the turns 44, 46 of helical mixing elements 36, 38 extend continuously throughout without interruption substantially over the entire axial length of the housing. That, however, is not absolutely necessary. In this case, the turns 44, 46 engage into each other with their inner portions, more specifically in the illustrated embodiment in such a way that the peripheral surface of a turn 44, 46 is almost or completely in contact with the core 40, 42 of the adjacent mixing element 36, 38. In addition, the peripheral surface of a turn 44, 46 is in portionwise contact with the inner surface of the peripheral portion 14 of the housing 12.

In a manner not shown here, it is also possible for more than two, for example three, four or more helical mixing elements to be arranged within the housing 12, preferably in mutually parallel and adjacent relationship.

The helical mixing elements 36, 38 are so arranged that free flow cross-sections are provided between the cores 40, 42 and the housing portions, the flow cross-sections being so shaped that material introduced through the inlet 20 can flow along those free flow cross-sections, guided by the turns 44, 46, through the interior of the mixing device 8, in that case the material is deflected and mixed in order then to be able to be discharged from the interior of the mixing device through the outlet 30.

In the illustrated embodiment the pitch of a turn is about 48 mm. The thickness of a turn is in the region of 8 mm. Each mixing element has for example about 4.5 flights. Those values, however, are to be adapted as respectively required to the respective foodstuff materials capable of flow, which are to be processed.

The mixing elements 36, 38 are static in operation, that is to say they are positioned non-rotatably and stationarily within the housing 12. For that purpose, provided at the connecting plates 16, 18 at the inner surface are substantially cylindrical recesses or depressions 48 in which the cylindrical end portions of the cores 40, 42 of the mixing elements 36, 38 are arranged. An additional releasable securing effect to prevent rotation is afforded in greater detail by pins and bores, which are described more fully hereinafter.

The perspective view in FIG. 3 shows the mixing device 8 with removed peripheral portion 14 of the housing 12. A securing device to prevent axial rotation serves the following purpose: at least one helical mixing element, in the illustrated embodiment the mixing element 38, is arranged rotatably about a longitudinal axis 39 and in operation can be fixed in a plurality of rotational positions by means of the securing device. For that purpose, provided in the turn 46 in the region of one of its ends is a bore 50 into which a cylindrical pin (not shown) can be introduced. In addition, provided in the connecting plate 18 of the housing 12 are two bores 52, 54 into which the pin can be inserted selectively in accordance with the respective rotational position of the rotatable mixing element 38, depending on whether the bore 50 is respectively aligned with the bore 52 or 54.

FIG. 4 shows two different rotational positions of the rotatable mixing element 38 in position 1 and position 2. The differences in position 1 in relation to position 2 in FIG. 4 show that the spacings of the turns 44, 46 of the mixing elements 36, 38 are of different sizes depending on the respective rotational position of the two mixing elements 36, 38, relative to each other, as can be very clearly seen in the inner region where the turns 44, 46 engage into each other. As can be seen from FIG. 4, a narrow gap $S_1$ is implemented in position 1 while an enlarged wider gap $S_2$ can be seen in position 2.

In that way, the free flow cross-sections for the material capable of flow can be varied depending on the properties of the respective material. Thus, it may be desirable to vary the free flow cross-sections for example in dependence on the viscosity of the material or whether delicate inclusions such as mushrooms or the like are or are not present in a sausage meat or another material. Such adaptation can be desirable in particular to achieve different mixer results. For example, it may be desirable to be able to vary the size of the free flow cross-sections in order to be able to particularly well finely distribute gas inclusions such as air bubbles, or the like, or to deal gently and carefully with the inclusions during the flow through the mixer.

Instead of adjustment and fixing by means of the bores 50, 52, 54 and a pin, other rotational and securing mechanisms would also be possible. Thus, for example, a motor drive could be provided for rotation of one of the mixing elements 36, 38.

The invention claimed is:

1. A filling machine for a foodstuff material, comprising:
a hopper-shaped supply container configured for receiving the foodstuff material;
a filling tube;
a filling pump configured to convey the foodstuff material from the supply container to the filling tube; and
a mixing device including a housing with an inlet in fluid communication with the filling tube for introduction of the foodstuff material from the filling tube, an outlet for discharge of the foodstuff material, and a plurality of helical mixing elements arranged statically and adjacent to each other within the housing, the helical mixing elements configured to mix and/or process the foodstuff material flowing through the housing,
wherein each helical mixing element has a substantially cylindrical core and a respective helically-extending turn projecting substantially radially from the core, a peripheral surface of at least one of the turns is almost or completely in contact with the core of an adjacent helical mixing element, and the peripheral surface of the turn of each of the helical mixing elements is in contacting relationship with the housing.

2. The filling machine of claim 1 wherein the turn of at least one of the helical mixing elements at least partially overlies in a substantially radial direction the turn of an adjacent helical mixing element.

3. The filling machine of claim 1, wherein the turns extend continuously without interruption substantially over an entire axial length of the housing.

4. The filling machine of claim 1, wherein each of the mixing elements includes a longitudinal axis, the longitudinal axes arranged in substantially mutually parallel relationship.

5. The filling machine of claim 1, wherein three or more helical mixing elements are arranged in mutually parallel and adjacent relationship within the housing.

6. The filling machine of claim 1, wherein at least one of the helical mixing elements is rotatable about a longitudinal axis between a plurality of rotational positions, the at least one of the helical mixing elements being rotationally fixable within the housing when positioned in any one of the plurality of rotational positions.

7. The filling machine of claim 6, wherein the housing includes a bore and the turn of the at least one of the helical mixing elements includes a bore, and further comprising:
a pin configured to rotationally fix the at least one of the helical mixing elements within the housing, the pin including a first end disposed within the bore in the housing and a second end disposed within the bore in the turn of the at least one of the helical mixing elements.

8. The filling machine of claim 1, wherein the housing has a peripheral portion, a first connecting plate that includes the inlet, and a second connecting plate oppositely disposed to the first connecting plate, the second connecting plate including the outlet.

9. The filling machine of claim 8, further comprising:
a tube connection arranged at the first connecting plate; and
a union nut,
wherein the tube connection and the union nut cooperate to secure the housing to a filling machine.

10. The filling machine of claim 8, further comprising:
a tube connection arranged at the first connecting plate and configured to couple the housing to an accessory device.

11. The filling machine of claim 1, wherein each of the turns has a pitch in the range of 12 mm to 72 mm, and/or each of the turns has a thickness in the range of 4 mm to 20 mm.

12. The filling machine of claim 1, wherein the helical mixing elements are arranged adjacent to each other in a radial direction.

* * * * *